US 6,707,373 B2

(12) United States Patent
Moreau

(10) Patent No.: US 6,707,373 B2
(45) Date of Patent: Mar. 16, 2004

(54) METHOD OF MAKING SECURE A HANDS-FREE ACCESS AND/OR STARTING SYSTEM FOR A MOTOR VEHICLE

(75) Inventor: Patricia Moreau, Paris (FR)

(73) Assignee: Valeo Electronique, Creteil (FR)

( * ) Notice: Subject to any disclaimer, the term of this patent is extended or adjusted under 35 U.S.C. 154(b) by 294 days.

(21) Appl. No.: 09/945,629

(22) Filed: Sep. 5, 2001

(65) Prior Publication Data

US 2002/0033751 A1 Mar. 21, 2002

(30) Foreign Application Priority Data

Sep. 5, 2000 (FR) ............................................ 00 11300

(51) Int. Cl.[7] ............................................ G05B 19/00
(52) U.S. Cl. ................... 340/5.21; 340/5.26; 340/5.31; 340/5.61; 340/5.62; 340/10.5; 340/426.1; 340/426.16; 340/426.36; 307/10.1; 307/10.2; 307/10.6
(58) Field of Search ...................... 340/5.21, 426.1, 340/426.16, 426.24, 426.3, 426.36, 539.11, 539.23, 5.61, 5.72, 5.62, 5.26, 5.31, 10.5; 307/10.2, 10.3, 10.6; 701/35

(56) References Cited

U.S. PATENT DOCUMENTS 4,763,121 A    8/1988  Tomoda et al.
5,347,263 A  *  9/1994  Carroll et al. ............. 340/5.61
5,638,273 A  *  6/1997  Coiner et al. ................. 701/35
6,141,610 A  * 10/2000  Rothert et al. ................ 701/35

FOREIGN PATENT DOCUMENTS

EP            0 770 749           3/1997

* cited by examiner

*Primary Examiner*—Michael Horabik
*Assistant Examiner*—Yves Dalencourt
(74) *Attorney, Agent, or Firm*—Liniak, Berenato & White

(57) ABSTRACT

The method of making secure a hands-free access and/or starting system for a motor vehicle, the hands-free system a control unit (2) placed in the vehicle and a portable identifier (1) suitable for communicating remotely and cordlessly with the control unit in order to be authenticated, the method consists in recording (30) a first data item in the identifier by communicating with the control unit in response to detecting starting of the vehicle engine, and in recording (60) a second data item to replace the first data item in the identifier by communicating with the control unit in response to detecting normal stopping of the vehicle engine. In the case of lending of the vehicle, the borrower of the vehicle must return an identifier containing the second data item in order to prove that he left the vehicle in an authorized manner.

9 Claims, 2 Drawing Sheets

METHOD OF MAKING SECURE A HANDS-FREE ACCESS AND/OR STARTING SYSTEM FOR A MOTOR VEHICLE

BACKGROUND OF THE INVENTION

1. Field of the Invention

The invention relates to hands-free access and/or starting systems for motor vehicles.

2. Description of Related Art

Such systems comprise a control unit installed in the vehicle and a portable identifier suitable for communicating remotely and cordlessly with the control unit in order to be authenticated by the control unit. The portable identifier is not especially intended to be rendered integral with the vehicle when the latter is running as is the case with a mechanical contact key. In the case of the lending of vehicles equipped with such hands-free access and/or starting systems, in particular for vehicle rental firms and company vehicle fleets, the fact that a user of a vehicle hands back the identifier associated with this vehicle is not sufficient to prove that this vehicle's engine has been stopped. Indeed, the vehicle may continue to run, engine ticking over, although the identifier has been returned to the owner of the vehicle. In this case, the owner of the vehicle is unable to ascertain whether the theft of the vehicle was committed by the last user of the vehicle or by a third party.

SUMMARY OF THE INVENTION

The object of the invention is therefore to make the operation of hands-free access and/or starting systems for motor vehicles secure so as to limit the possibilities of fraud in particular in the situations indicated above.

Accordingly, the subject of the invention is a method of making secure a hands-free access and/or starting system for a motor vehicle, the hands-free system comprising a control unit placed in the vehicle and a portable identifier suitable for communicating remotely and cordlessly with the control unit in order to be authenticated, the method being characterized in that it consists in recording a first data item in the identifier by communicating with the control unit in response to detecting starting of the vehicle engine, and in recording a second data item to replace the first data item in the identifier by communicating with the control unit in response to detecting normal stopping of the vehicle engine.

Consequently, with this method, when the identifier is returned by the user, it is possible to ascertain whether the vehicle has been left with the engine ticking over or with the engine stopped by this person depending on whether the identifier contains the first or the second data item in memory. The reading of this data item may be done directly on a display screen provided on the identifier or by way of a reader terminal to which the identifier will be connected up.

According to a particular embodiment of the method according to the invention, said first and second data items are recorded in the identifier and in the vehicle so as to prove a break-in in the case of the theft of the vehicle. Indeed, when this vehicle is recovered, if the latter contains the first data item, this signifies that it was left in an unauthorized manner by the last person who returned the identifier. Conversely, if the latter contains the second data item, this signifies that this last person left the vehicle normally.

BRIEF DESCRIPTION OF THE DRAWINGS

An example of the implementation of the method according to the invention is described hereinbelow in detail and illustrated in the drawings.

DETAILED DESCRIPTION OF THE PREFERRED EMBODIMENTS

Figure 1:
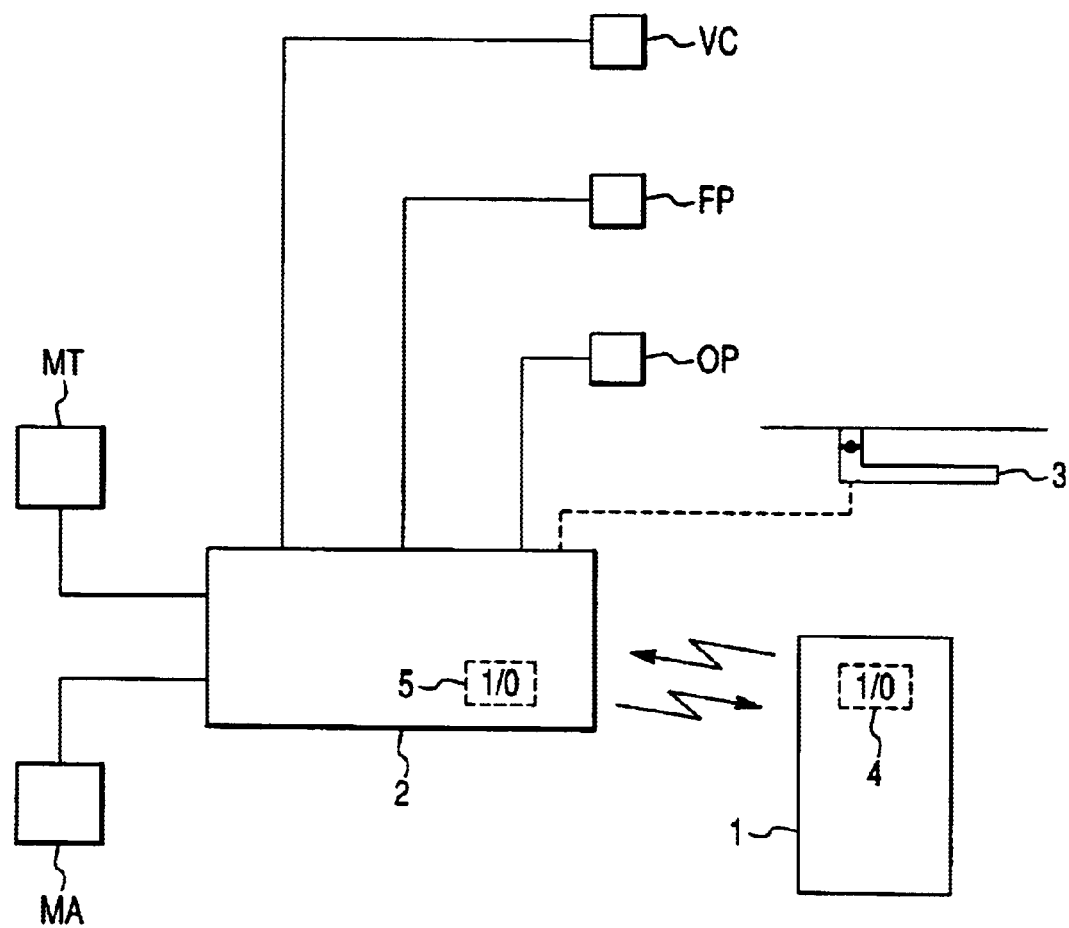
FIG. 1 shows very diagrammatically the elements of a hands-free system for a motor vehicle.

FIG. 1, the hands-free access and/or starting system for a motor vehicle conventionally comprises a portable identifier 1 intended to be carried by the authorized user of the vehicle and a control unit 2 placed in the vehicle.

The identifier is suitable for communicating cordlessly over a certain distance with the control unit in order to be authenticated by the latter. Following authentication, in a known manner, the unit 2 instructs the unlocking of the doors of the vehicle and/or authorizes the starting of the vehicle engine by freeing for example the fuel injection pump and/or by unlocking the steering column of the vehicle. The authentication process can be triggered for example by operating a door handle 3 on the vehicle which interacts on the unit 2. With such a system, the starting of the vehicle engine and also the normal stopping of the engine are done by operating a button. Signals indicative of the opening or of the closing of a vehicle door, of the ticking over or stopped state of the vehicle engine are generally received by the control unit 2 from various sensors located on the vehicle. These signals allow the control unit to carry out the control and command functions. FIG. 1, illustrated therein by way of nonlimiting examples are various sensors linked to the control unit 2: OP designates a sensor which delivers a signal indicative of the opening of a door of the vehicle; FP designates a sensor which delivers a signal indicative of the closing of a door of the vehicle; VC designates a sensor which delivers a signal indicative of the locking of the steering column; MA designates a sensor which delivers a signal indicative of the stopping of the engine; MT designates a sensor which delivers a signal indicating that the engine is ticking over. These various sensors are well known in the state of the art.

Figure 2:
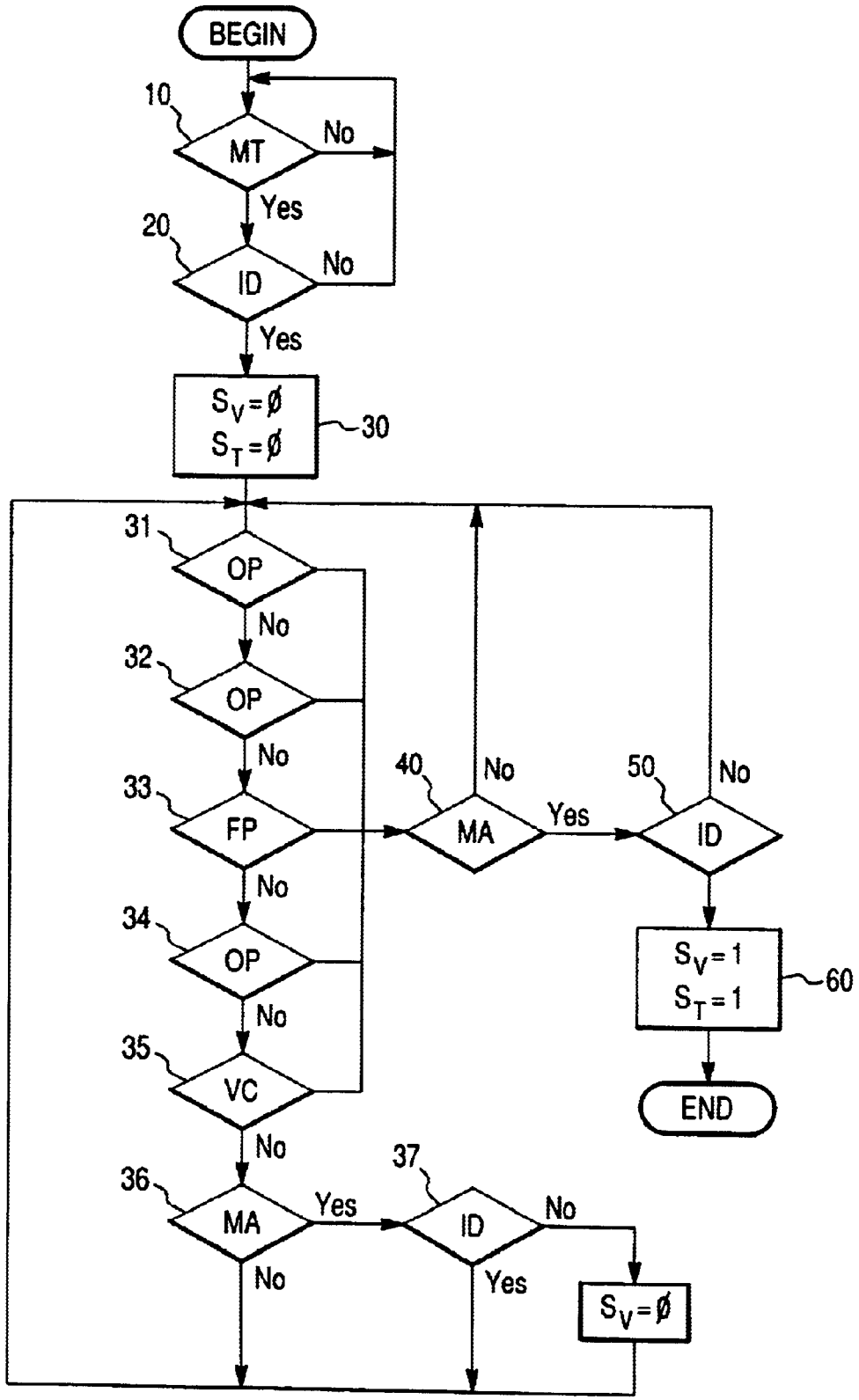
FIG. 2 is a very simplified flowchart which illustrates the implementation of the method according to the invention.

The identifier 1 of such a system is not generally designed to be rendered integral with the running vehicle as is the case with a mechanical contact key. To alleviate this drawback and enhance the security of the hands-free system, the control unit and the identifier are contrived so as to execute a process which is illustrated in FIG. 2 and described hereinbelow.

An authorized carrier of the identifier 1 approaches the vehicle and operates for example a door handle of the vehicle, thereby actuating the control unit 2 in the vehicle. After authentication of the identifier by the control unit, the doors of the vehicle are unlocked and this causes the process for making secure the hands-free system to begin. At 10, the control unit 2 waits for the detection of the starting of the vehicle engine. As soon as the control unit 2 receives a signal from the sensor MT indicating that the engine is ticking over, it establishes at 20 a communication ID with the identifier. If this communication cannot be established in a predetermined time, the process resumes at step 10. In the converse case at 30, by way of the communication between the control unit 2 and the identifier 1, a first data item, for example 0, is recorded in the memory 4 of the identifier. This is symbolized in FIG. 2 by St=0. In parallel with this, the same data item can be recorded simultaneously or otherwise in the memory 5 of the control unit. This is symbolized in FIG. 2 by Sv=0.

This first data item in memory in the identifier and, as appropriate, in the vehicle may simply be a data item having two states, such as a data bit.

Then at 40, the control unit waits for the detection of normal stopping of the vehicle engine. The expression normal stopping should be understood to mean stopping brought about by way of the engine stop button with the presence of the identifier in the vehicle. As soon as the control unit 2 receives a signal from the sensor MA indicating that the engine is stopped, it establishes at 50 a communication ID with the identifier. If this communication cannot be established in a predetermined time, the process resumes just after step 30. In the converse case at 60, by way of the communication between the control unit 2 and the identifier 1, a second data item, for example 1, different from the first data item, is recorded in the memory 4 of the identifier in place of the first data item. This is symbolized in FIG. 2 by St=1. In parallel with this, the same data item can be recorded in the memory 5 of the control unit. This is symbolized in FIG. 2 by Sv=1.

Consequently, if the carrier of the identifier returns an identifier in which the second data item is recorded, this signifies that this person left the vehicle in an authorized manner, with the engine stopped. Conversely, if the identifier contains the first data item, this signifies that this person left the vehicle with the engine still going, this being a case of fraud.

To further enhance the securing process, the control unit 2 before waiting at 40 for the detection of the normal stopping of the engine, can be placed on standby awaiting detection of the realization of one or more other preliminary conditions. Thus, as may be seen in FIG. 2, after step 30 and before step 40, the control unit is placed for example in standby at 31 awaiting detection of a door opening by the sensor OP, and/or at 32 awaiting detection of a vehicle locking command, and/or at 33 awaiting detection of a door closing by the sensor FP, and/or at 34 awaiting detection of the locking of the fuel injection pump, and/or at 35 awaiting detection of the locking of the steering column by the sensor VC and/or of the gear box of the vehicle. Thus, the second data item is recorded in the identifier 1 only if at least one condition of steps 31 to 35 is realized and the engine stopped normally while the identifier is in the zone of communication of the control unit. It should be understood that security will be further enhanced if before step 40 the control unit verifies that all the conditions of steps 31 to 35 hold simultaneously.

Moreover, as illustrated in FIG. 2, if none of the conditions of steps 31 and 35 is realized but should the control unit detect at 36 via the sensor MA a stopping of the engine and should the control unit detect at 37 that the identifier is not in the zone of communication ID of the control unit, then the first data item is recorded in the memory 5 by the control unit (step 37) so as to yet further limit the possibilities of fraud. This is symbolized in FIG. 2 by Sv=0.

According to the invention, said first and second data items are recorded in the identifier in steps 30 and 60 in recoverable manner for display on a display screen provided on the identifier or on a reader terminal to which the identifier is connected. The identifier display screen could conventionally be a small liquid crystal screen.

What is claimed is:

1. A method of making secure a hands-free access and/or starting system for a motor vehicle, the hands-free system comprising a control unit (2) placed in the vehicle and a portable identifier (1) suitable for communicating remotely and cordlessly with the control unit in order to be authenticated, the method being characterized in that it consists in recording (30) a first data item in the identifier by communicating with the control unit in response to detecting starting of the vehicle engine, and in recording (60) a second data item to replace the first data item in the identifier by communicating with the control unit in response to detecting normal stopping of the vehicle engine.

2. The method of claim 1, in which said first and second data items are recorded in the vehicle and in the identifier.

3. The method of claim 1, in which said second data item is recorded in the identifier and/or in the vehicle in response to detecting (31) the opening of the vehicle while the motor is stopped normally.

4. The method of claim 1, in which said second data item is recorded in the identifier and/or in the vehicle in response to detecting (32) the locking of the vehicle while the motor is stopped normally.

5. The method of claim 1, in which said second data item is recorded in the identifier and/or in the vehicle in response to detecting (33) the closing of a door while the motor is stopped normally.

6. The method of claim 1, in which said second data item is recorded in the identifier and/or in the vehicle in response to detecting (34) the locking of the fuel injection of the vehicle while the motor is stopped normally.

7. The method of claim 1, in which said second data item is recorded in the identifier and/or in the vehicle in response to detecting (35) the locking of steering column of the vehicle while the motor is stopped normally.

8. The method of claim 1, in which said second data item is recorded in the identifier and/or in the vehicle in response to detecting (35) the locking of the gear box of the vehicle while the motor is stopped normally.

9. The method of claim 1, in which said first and second data items are recorded in the identifier in recoverable manner for display on a display screen provided on the identifier or on a reader terminal to which the identifier is connected.

* * * * *